United States Patent
Okada et al.

[11] Patent Number: 5,924,656
[45] Date of Patent: *Jul. 20, 1999

[54] THERMAL INSULATING SUPPORTING DEVICE FOR PIPING

[75] Inventors: Akira Okada, Kamakura; Mamoru Morohashi, Yokohama; Toshikazu Nakamura, Yokosuka; Satoshi Hama, Yokohama, all of Japan

[73] Assignee: JGC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/661,158

[22] Filed: Jun. 12, 1996

[30] Foreign Application Priority Data

Jun. 16, 1995 [JP] Japan ................. 7-150379

[51] Int. Cl.$^6$ ................................. F16L 3/00
[52] U.S. Cl. ................. 248/73; 248/58; 138/106
[58] Field of Search ................ 248/73, 49, 55, 248/47, 65, 62, 207; 285/93, 156; 138/112, 113, 149

[56] References Cited

U.S. PATENT DOCUMENTS

| | | | |
|---|---|---|---|
| 2,738,151 | 3/1956 | Herzog | 248/55 |
| 3,298,644 | 1/1967 | Sherburne | 248/55 |
| 3,390,854 | 7/1968 | Sherburne | 248/55 |
| 3,856,246 | 12/1974 | Sinko | 138/112 |
| 3,863,679 | 2/1975 | Young | 138/106 |
| 3,865,145 | 2/1975 | McKay et al. | 138/113 |
| 3,891,006 | 6/1975 | Lee | 138/112 |
| 4,134,563 | 1/1979 | Pollono | 248/58 |
| 4,315,528 | 2/1982 | Pouderoux et al. | 138/106 |
| 4,403,759 | 9/1983 | Hicks | 248/55 |
| 4,429,497 | 2/1984 | Dibernardi | 52/27 |
| 4,713,271 | 12/1987 | Searl et al. | 428/36 |
| 4,852,831 | 8/1989 | Sandstrom | 248/58 |
| 5,381,833 | 1/1995 | Cummings et al. | 138/107 |

*Primary Examiner*—Ramon O. Ramirez
*Assistant Examiner*—Anita M. King
*Attorney, Agent, or Firm*—Greer, Burns, & Crain, Ltd.

[57] ABSTRACT

A thermal insulating supporting device for piping has a supporting member which is formed by cutting to specified dimensions a long member which has a specified cross-sectional shape, and which is made of a resin material that has heat-insulating properties and sufficient strength to support piping. The supporting device supports piping by connecting the supporting member to a supporting frame which is fastened to the piping.

14 Claims, 8 Drawing Sheets

THERMAL INSULATING SUPPORTING DEVICE FOR PIPING

BACKGROUND OF THE INVENTION

1. Field of Invention

The present invention generally relates to thermal insulating supporting devices for piping, and more particularly to such devices which are used for the secure thermal insulated support of piping for transporting various types of cryogenic-temperature fluids.

2. Description of the Related Art

To install piping for transporting cryogenic-temperature fluids such as LNG (liquified natural gas) or LPG (liquefied petroleum gas) in specified locations during the construction of various types of plants, supporting devices having an appropriate thermal insulating performance are required in order to achieve secure support of the weight of the piping and the fluid contained in the piping.

As shown in FIG. 7, a conventional piping supporting device A is so assembled that an upper plate A1 and an under plate A2 are connected to each other by anchor bolts A4 with various types of thermal insulated members A3a through A3g being clamped between the upper plate A1 and under plate A2. Piping P is installed in a bracket A5 which is disposed on the upper plate A1 therefor has been provided as a supporting device which satisfies the above mentioned conditions.

However, in the supporting device A described above, although the weight of the piping P and the fluid contained in the piping can be securely supported, since the upper plate A1 and under plate A2 are connected by the anchor bolts A4, heat in the piping P is transferred via the bracket A5, upper plate A1 and anchor bolts A4 so that a large heat loss is experienced.

There is another conventional prior art supporting device which has an appropriate thermal insulating performance and which is capable of securely supporting the weight of the piping and the fluid contained in the piping. In this supporting device, the outer circumference of the piping is covered by a thermal insulating material, and a piping support is formed from a molded urethane block in accordance with the thickness of the thermal insulating material and the external diameter of the piping, with the piping being fastened in place in a specified position via the piping support.

Specifically, as shown in FIG. 8, a supporting device B is so assembled that urethane blocks B1a, B1b, B1c are mounted on the outer circumference of the piping P as thermal insulating members. The urethane blocks B1a, B1b, B1c are covered by a pair of pipe clamps B2a, B2b, and the piping P is supported in a specified position with a shoe B3 which is fastened to the pipe clamp B2a. This supporting device B has effective thermal insulating properties as a result of the provision of the urethane blocks B1a through B1c.

However, the respective urethane blocks B1a through B1c are specially manufactured in accordance with the size (external diameter) of the piping P. Accordingly, not only are the costs involved in design and manufacture at the factory extremely high, but the personnel costs involved in the control of the respective unit parts from the design stage to the installation stage are also considerable.

Furthermore, since piping designs are frequently altered according to on-site conditions, there is not only a further increase in cost due to accompanying design alterations in the piping support, but also a significant increase in various other costs, such as the transportation cost involved in the transportation of urgent additional orders of piping supports or new piping supports to the site.

Moreover, in cases where there are unavoidable design changes in piping and piping supports at piping construction sites, it is often necessary to communicate with the factory in order to order new piping supports, and to wait for the new piping supports to be delivered to the construction site following design and manufacture at the factory. Accordingly, there is a danger that on-site construction schedules may be greatly delayed, thus causing disruptions in the overall scheduling of plant construction projects.

SUMMARY OF THE INVENTION

In view of the facts described above, an object of the present invention is to provide a thermal insulating supporting device for piping which avoids the various types of cost increases involved with the above described designs, and which allows piping construction to be accomplished in a smooth manner.

The thermal insulating supporting device for piping according to the present invention has a supporting member which is formed by cutting a long member to specified dimensions having a specified cross-sectional shape and made of a resin material that has thermal insulating properties and sufficient strength to support piping. The supporting device of the present invention supports piping by connecting the supporting member to a supporting frame which is fastened to the piping.

In the above device, the supporting member is not a special member dedicated only for a single specified pipe size. Accordingly, in the case of expected design changes, the supporting member can easily be manufactured at the piping construction site by cutting the preformed long member to specified dimensions.

Thus, if the thermal insulating supporting device for piping according to the present invention is used, there is little danger of large increased costs due to design changes in the supporting member. Furthermore, there is no need of expenditures for transporting new piping supports to the construction site following such design changes. Accordingly, increases in various costs involved in piping construction can be effectively minimized.

Furthermore, if the thermal insulating supporting device for piping according to the present invention is used, there is no need to wait for new piping supports to be delivered to the construction site following design changes. Accordingly, piping construction can be accomplished in a smooth manner, and delays in construction schedules caused by most expected design changes can be prevented.

Other objects and advantages will be apparent from the following detailed description, in conjunction with the attached drawings.

DESCRIPTION OF THE PREFERRED EMBODIMENTS

Figure 1:
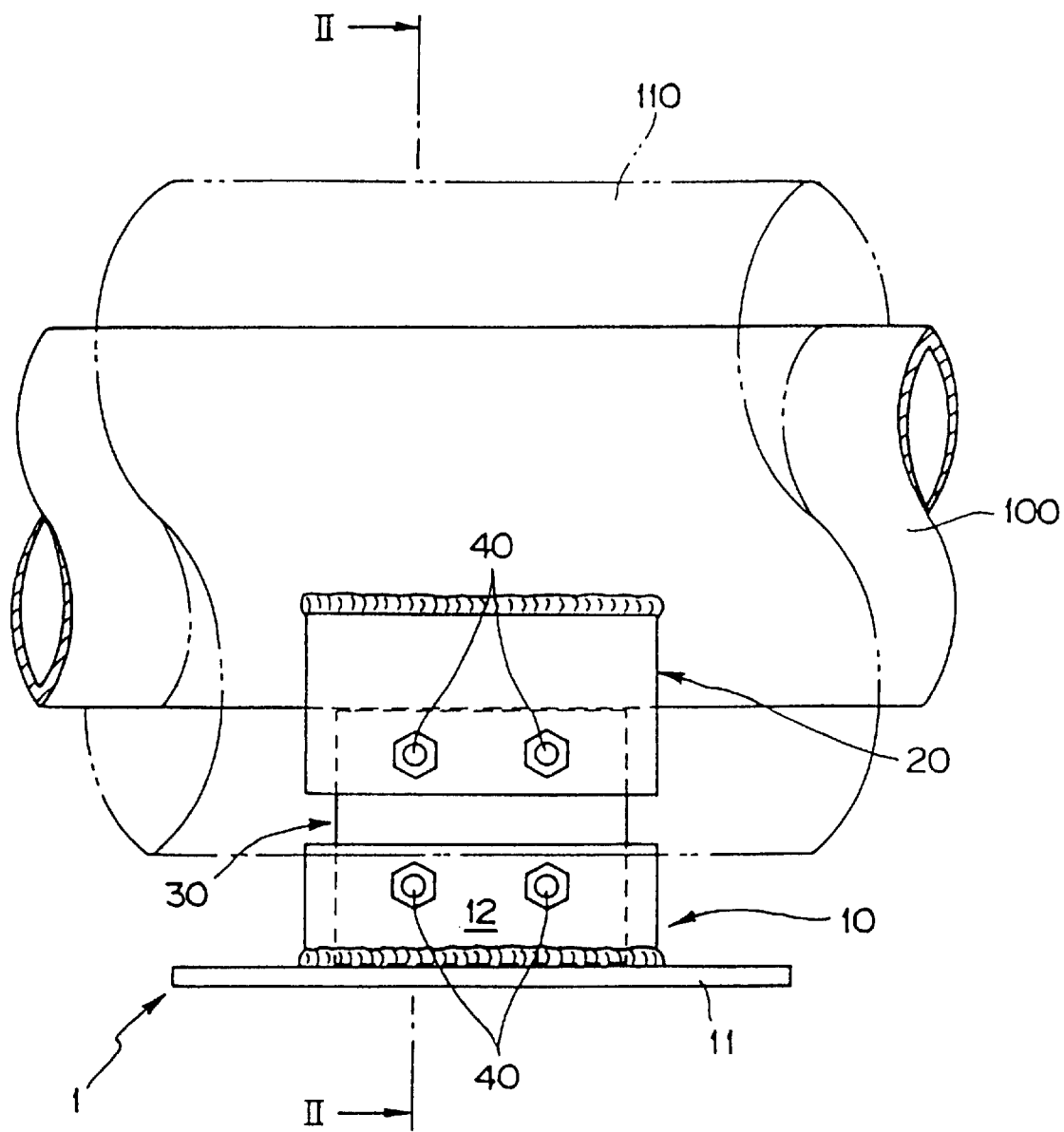
FIG. 1 is a side view showing a thermal insulating supporting device for piping according to the present invention.
Figure 2:
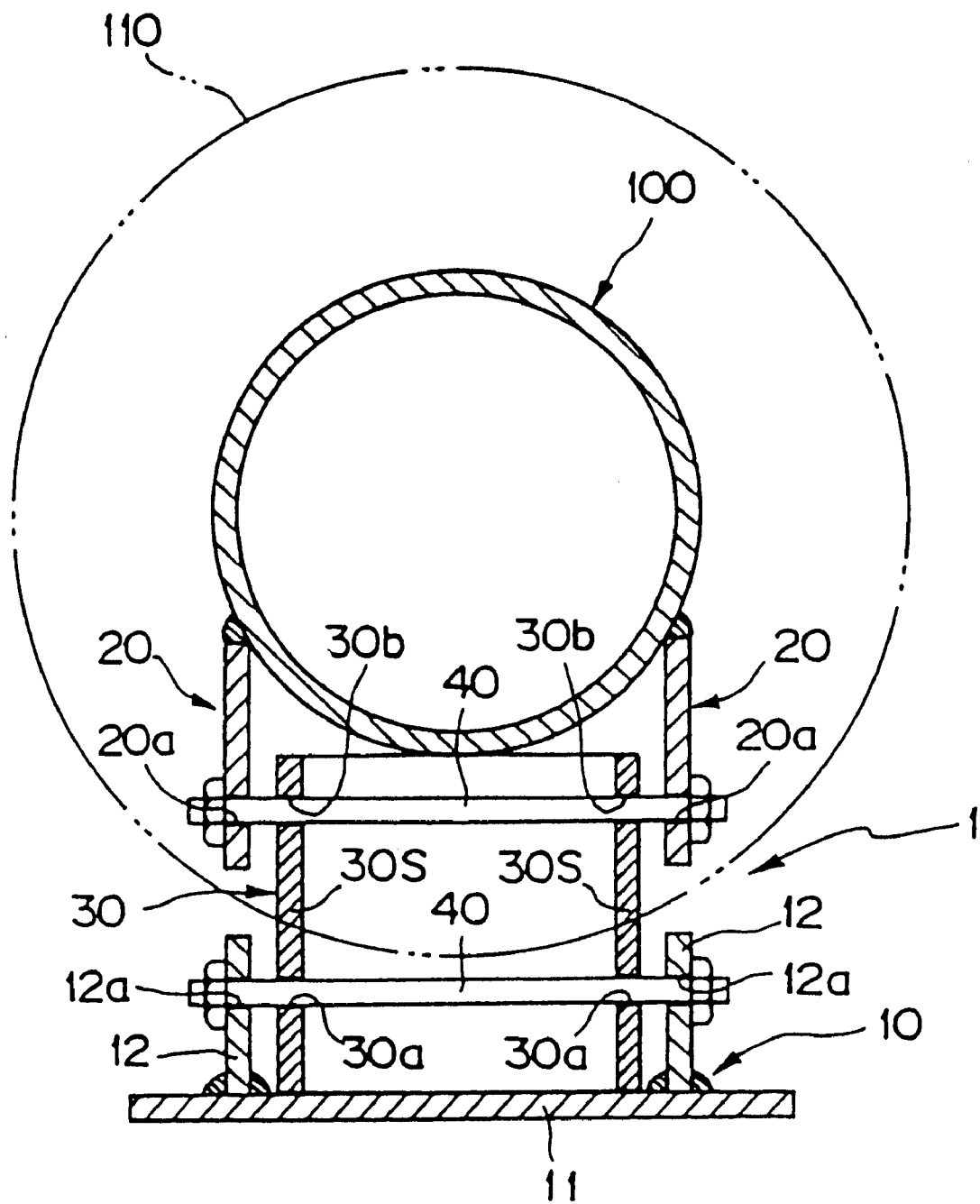
FIG. 2 is a sectional view taken along line II—II in FIG. 1.

FIGS. 1 and 2 show an example in which piping used for fluid transport at low temperatures of −40 to −50° C. is supported by means of a thermal insulating supporting device for piping assembled according to the present invention in an NGL (natural gasoline) recovery apparatus in a chemical plant.

The thermal insulating supporting device 1 has a base frame 10, shoes 20 which act as a supporting frame, and a piping support 30 which acts as a supporting member.

Figure 3:
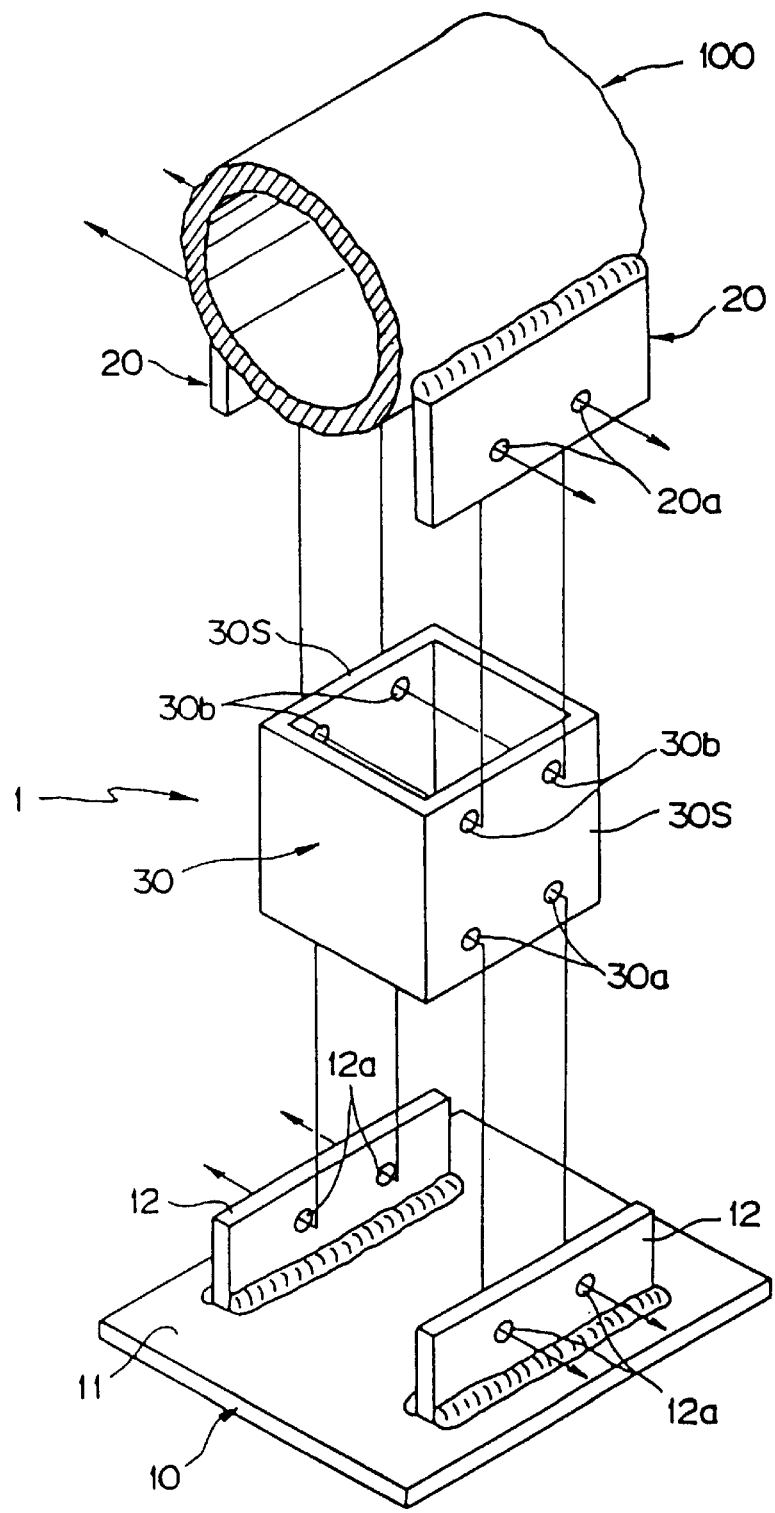
FIG. 3 is a an exploded perspective view of the heat-insulating supporting device for piping according to the present invention.

The base frame 10 is formed from an assembly consisting of carbon steel plates which comprises, as shown in FIGS. 1 through 3, a bottom plate 11 which extends in a horizontal plane, and a pair of side plates 12 which are installed facing each other in upright positions on the bottom plate 11. This base frame 10 is installed in a specified position on a pillar or girder (not shown in the drawings) which is a constituent member of the plant.

In the side plates 12 of the base frame 10, holes 12a through which respective bolt shafts are passed, are formed.

The pair of shoes 20 which act as a supporting frame are formed from plates made of the same material as the piping 100, for example, carbon steel plates in cases where the piping is carbon steel piping, or stainless steel plates in cases where the piping is stainless steel piping. As is shown in FIGS. 1 through 3, these shoes 20 are fastened to the outer circumferential surface of the piping 100 by welding such that the shoes 20 face each other and extend in the vertical direction.

Holes 20a, through which respective bolt shafts are passed, are formed in the shoes 20.

As is shown in FIGS. 1 through 3, the piping support 30 which acts as a supporting member has the shape of a square tube, with holes 30a and 30b through which respective bolt shafts are passed being formed in the opposite side plates 30S.

The piping support 30 is formed by cutting a lone square pipe to specified dimensions made of a resin material, i. e., FRP (fiber-reinforced plastic), which has thermal insulating properties and sufficient strength to support the piping 100. This piping support 30 can easily be manufactured by cutting a commercially marketed square pipe.

As is clear from FIGS. 1 and 2, the piping support 30 is mounted on the base frame 10, and the piping 100 is mounted on the upper portion of the piping support 30.

Bolt shafts 40 made of carbon steel are passed through each of the holes 30a formed in the respective side plates 30S of the piping support 30 so that the bolt shafts 40 respectively extend in a horizontal direction. The end portions of the bolt shafts 40 are passed through the holes 12a formed in the side plates 12 of the base frame 10, and are fastened to the side plates 12 by means of nuts.

Furthermore, bolt shafts 40 made of stainless steel are passed through the holes 30b formed in the respective side plates 30S of the piping support 30 so that these bolt shafts 40 respectively extend in a horizontal direction. The end portions of these bolt shafts 40 are passed through the holes 20a formed in the shoes 20, and are fastened to the shoes 20 by means of nuts.

Thus, the piping 100 is connected to the piping support 30 via the bolt shafts 40, and the piping support 30 is connected to the base frame 10 via other bolt shafts 40 so that the weight of the piping 100 is securely supported by the base frame 10 via the piping support 30.

Since the piping support 30 is made of an FRP (fiber-reinforced plastic) as was described above, in other words, since a piping support 30 which has thermal insulating properties is interposed between the piping 100 and the base frame 10, an effective thermal insulating effect is obtained.

In the assembly described above, the piping 100 is mounted on the piping support 30, and the piping support 30 is mounted on the base frame 10. However, it would of course also be possible to remove the piping support 30 from the bottom plate 11 of the base frame 10 and support the piping support 30 by means of the bolt shafts 40, and to remove the piping 100 from the piping support 30 and support the piping 100 by means of the bolt shafts 40, thus constructing the device so that weight of the piping 100 is supported by the piping support 30 and the four bolt shafts 40.

Meanwhile, as is shown in FIGS. 1 and 2, a heat-insulating material 110 is mounted on the outer circumference of the piping 100. An opening (not shown in the figures) is formed in the thermal insulating material 110 in such a manner as to avoid the thermal insulating supporting device 1 described above. The opening in the thermal insulating material 110 is filled with a foam-type thermal insulating material (not shown in the figures) by on-site work in order to prevent the piping 100 from being exposed to the outside.

The piping support 30 in the thermal insulating supporting device 1 described above is formed by cutting (to specified dimensions) a long square pipe which has a specified cross-sectional shape and which is made of a resin material, i.e., FRP (fiber-reinforced plastic), that has thermal insulating properties and sufficient strength to support the piping. Accordingly, even if design changes should occur, new piping supports can easily be manufactured at the piping construction site.

As a result, even when the design of piping is changed, there is no increase in cost of manufacture of new piping supports according to the design changes of the piping. Furthermore, no additional costs are incurred as a result of transporting new piping supports to the construction site. Accordingly, increases in the various costs involved in piping construction can be prevented.

Furthermore, there is no need to wait for the delivery of new piping supports to the construction site following design changes of piping, and accordingly, there are no unexpected delays in piping construction due to design changes. Accordingly, project schedules can be maintained, and the time required for construction work may be shortened.

Moreover, in cases where plants are constructed in developing countries, new piping supports can be manufactured by inexpensive local labor. Accordingly, cost of the parts of the piping supports themselves can be reduced.

Furthermore, since new piping supports can be manufactured on-site, there is no need to send orders to the factory, or to perform design and manufacturing work at the factory. Accordingly, control work in various departments of the factory ordinarily involved in the ordering of new piping supports can be greatly reduced.

Moreover, as was described above, the piping support 30 can easily be manufactured by cutting a long square pipe to specified dimensions. Accordingly, it is necessary only to deliver the square pipes which are the stock material of the piping supports to the construction site. Since these long square pipes can be packaged more efficiently than the finished piping supports, and can be shipped in greater quantities in terms of unit piping supports per unit volume than the finished piping supports, the transportation cost per unit piping support can be reduced.

Furthermore, since commercially marketed square pipes can be used as the stock material of the piping supports, the piping support stock material can be prepared in advance, so that piping construction can be accomplished in a smooth manner.

Figure 4:
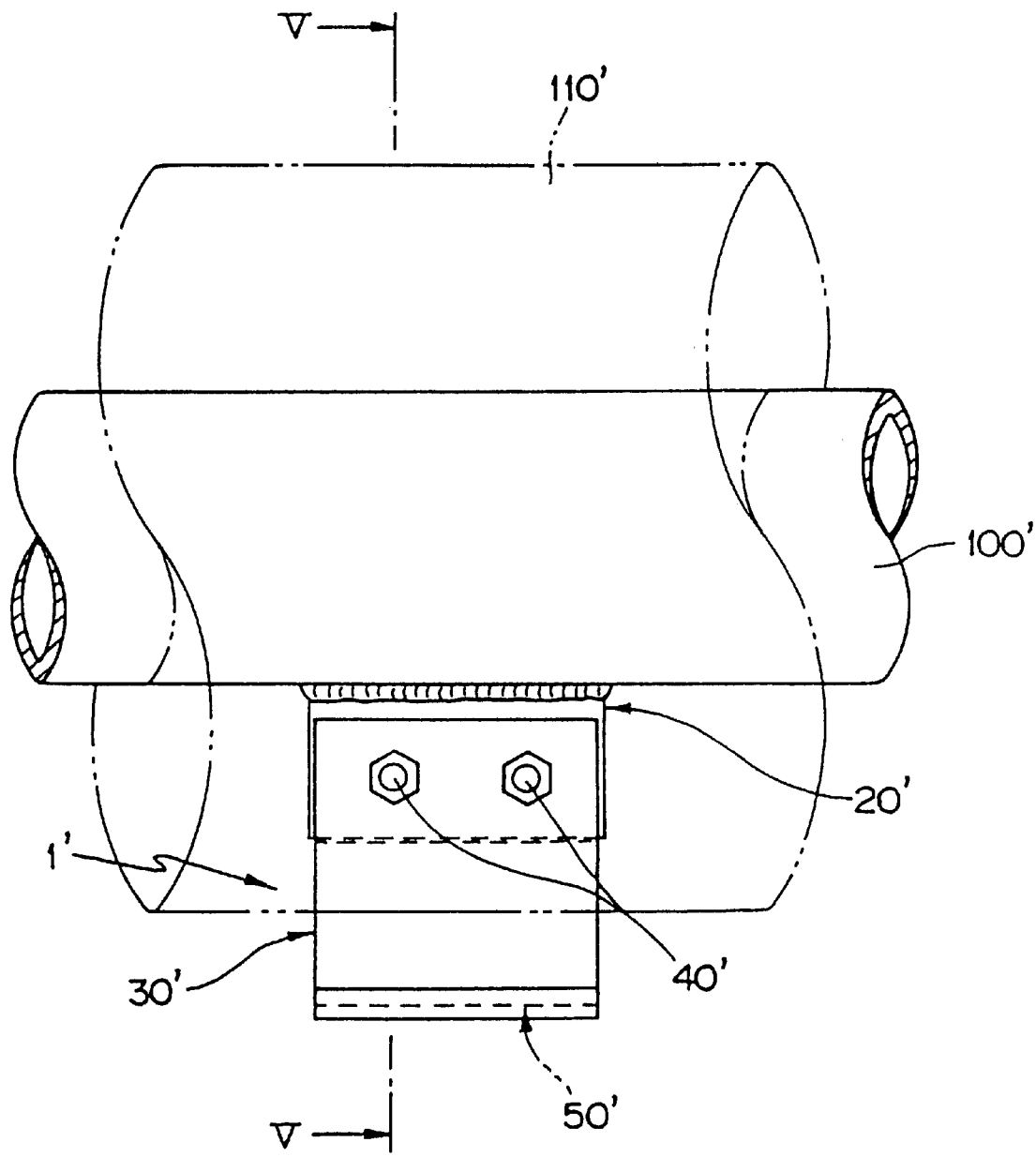
FIG. 4 is a side view showing another thermal insulating supporting device for piping according to the present invention.
Figure 5:
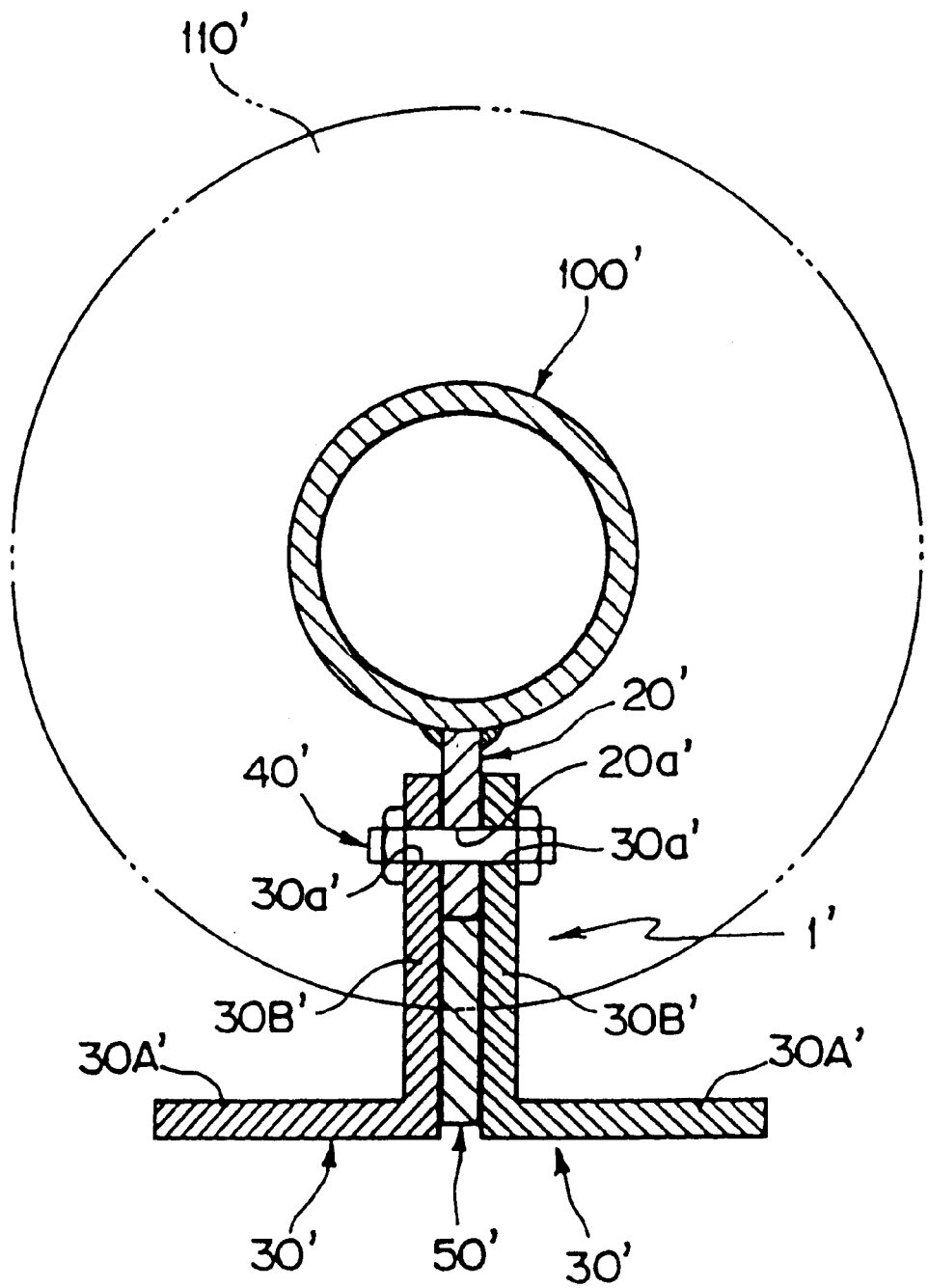
FIG. 5 is a sectional view taken along line V—V in FIG. 4.

Referring now to FIGS. 4 and 5, the thermal insulating supporting device 1' for piping is equipped with a shoe 20' which is installed on the piping 100' as a supporting frame, and a pair of piping supports 30' which constitute a supporting member.

The shoe 20' consists of a plate made of the same material as the piping 100', and is fastened to the lower circumferential surface of the piping 100'. Holes 20a' through which bolt shafts are passed, are formed in the shoe 20'.

As is shown in FIG. 5, each of the piping supports 30' which together act as a supporting member has a L-shaped cross section consisting of a bottom plate 30A' and a side plate 30B'. These piping supports 30' are installed in a specified position on a pillar or girder which is a constituent member of the plant.

Furthermore, holes 30a' through which respective bolt shafts are passed are formed in the side plates 30B' of the piping supports 30'.

Each of the piping supports 30' is formed by cutting to specified dimensions a long piece of angle stock made of a resin material, i. e., FRP (fiber-reinforced plastic), which has thermal insulating properties and sufficient strength to support the piping 100'. These piping supports 30' can easily be manufactured by cutting commercially marketed angle stock.

The piping supports 30' are installed so that the respective side plates 30B' of the piping supports 30' face each other with the shoe 20' clamped in between. The end portions of the bolt shafts 40' passed through the holes 20a' formed in the shoe 20' are passed through the holes 30a' formed in the side plates 30B' of the piping supports 30', and are fastened to the respective side plates 30B' by means of nuts.

A plate 50' formed from the same FRP (fiber-reinforced plastic) as the piping supports 30', or from a material which has the same thermal insulating properties as this FRP, is fastened in place between the mutually facing side plates 30B' of the piping supports 30' in the area beneath the shoe 20' by being bonded to the respective side plates 30B'.

Thus, the piping 100' is connected to the piping supports 30' via the shoe 20' and bolt shafts 40', so that the weight of the piping 100' is securely supported by the piping supports 30'.

The piping supports 30' are joined into an integral unit via the bolt shafts 40' and plate 50'. With this structure, a large mechanical strength is obtained, so that the piping 100' is securely supported.

Since the piping supports 30' are made of an FRP (fiber-reinforced plastic), that is, since the piping 100' is installed in a specified position on a pillar or girder via piping supports 30' which have thermal insulating properties, an effective thermal insulating effect is obtained.

Furthermore, since a plate 50' which has thermal insulating properties is attached between the piping supports 30' so that the lower end of the shoe 20' is covered, a greatly improved thermal insulating effect is obtained.

In addition, a thermal insulating material 110' is mounted on the outer circumference of the piping 100', and an opening (not shown in the drawings) is formed in this thermal insulating material 110' so that the thermal insulating material 110' avoids the thermal insulating supporting device 1' described above.

Furthermore, the opening (not shown in the drawings) in the thermal insulating material 110' is filled with a foam-type thermal insulating material (not shown in the drawings) by on-site work in order to prevent the piping 100' from being exposed to the outside.

Moreover, in cases where the thermal insulating material 110' is made of a material which has sufficient pliability, it would also be possible to achieve heat insulation of the piping 100' by forming a slit in a portion of the heat-insulating material 110', passing the thermal insulating supporting device 1' through this slit, and deforming the thermal insulating material 110' in conformity with the heat-insulating supporting device 1' so that the exposure of the piping 100' to the outside is prevented.

In the assembly of the thermal insulating supporting device 1' described above, as in the thermal insulating supporting device 1 described in detail earlier, increases in various costs involved in piping construction can be effectively prevented, and piping construction can be smoothly performed.

Furthermore, it goes without saying that the various effects obtained in the case of the thermal insulating supporting device 1 described earlier can also be achieved in the thermal insulating supporting device 1'. Accordingly, a detailed description of these individual effects is omitted.

Figure 6A:
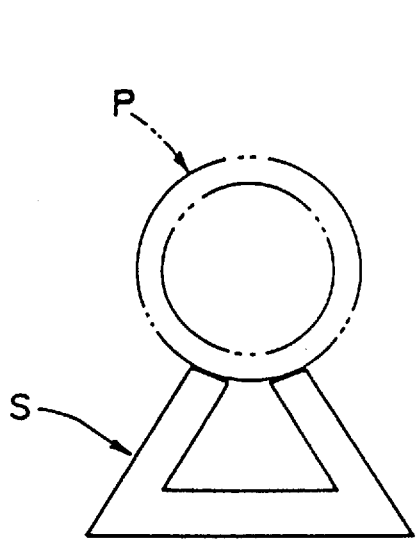
FIGS. 6(a), 6(b), 6(c) and 6(d) are end views of various types of supporting members in thermal insulating supporting devices for piping assembled according to the present invention.
Figure 6B:
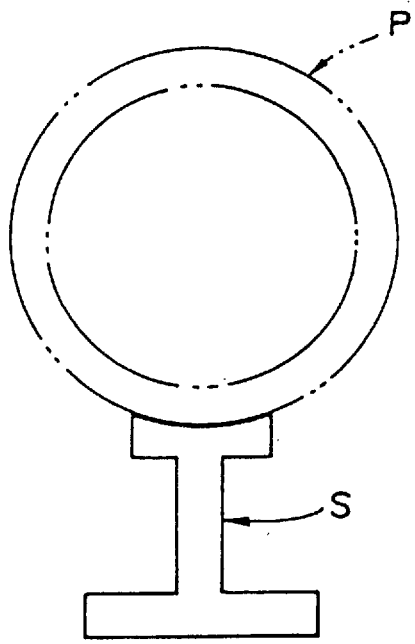
Figure 6C:
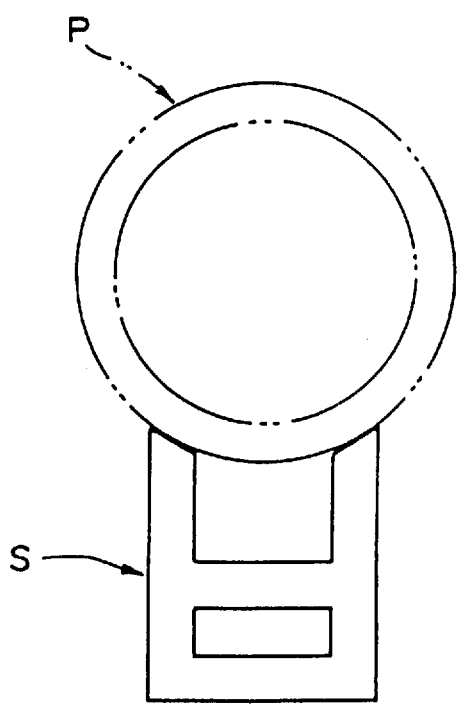
Figure 6D:
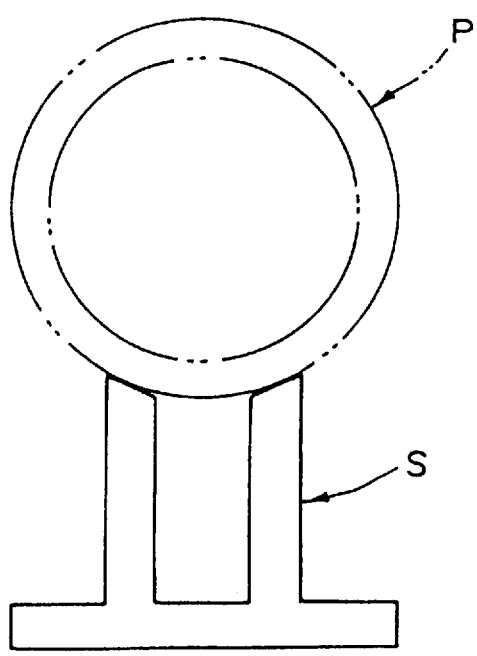
Figure 7:
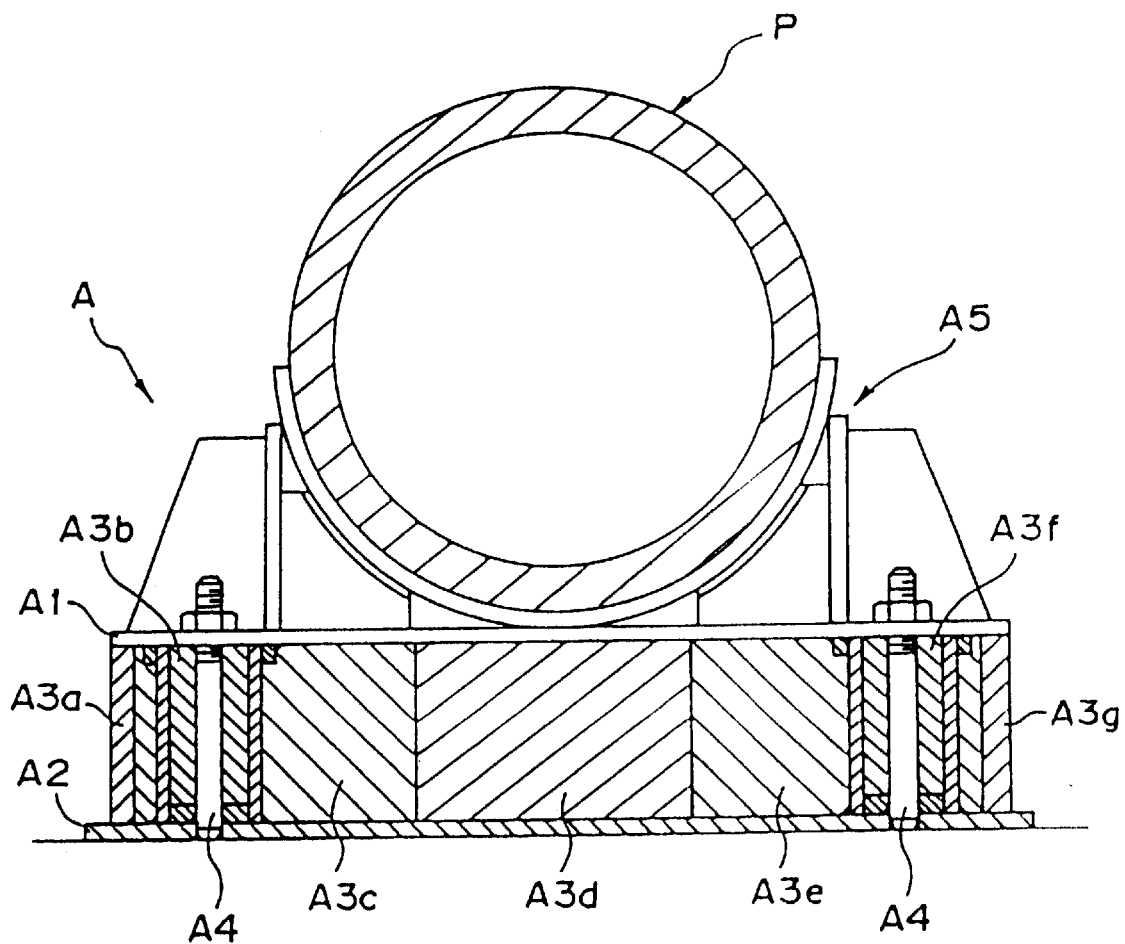
FIG. 7 is a sectional view illustrating a conventional prior art thermal insulating supporting device together with piping.
Figure 8:
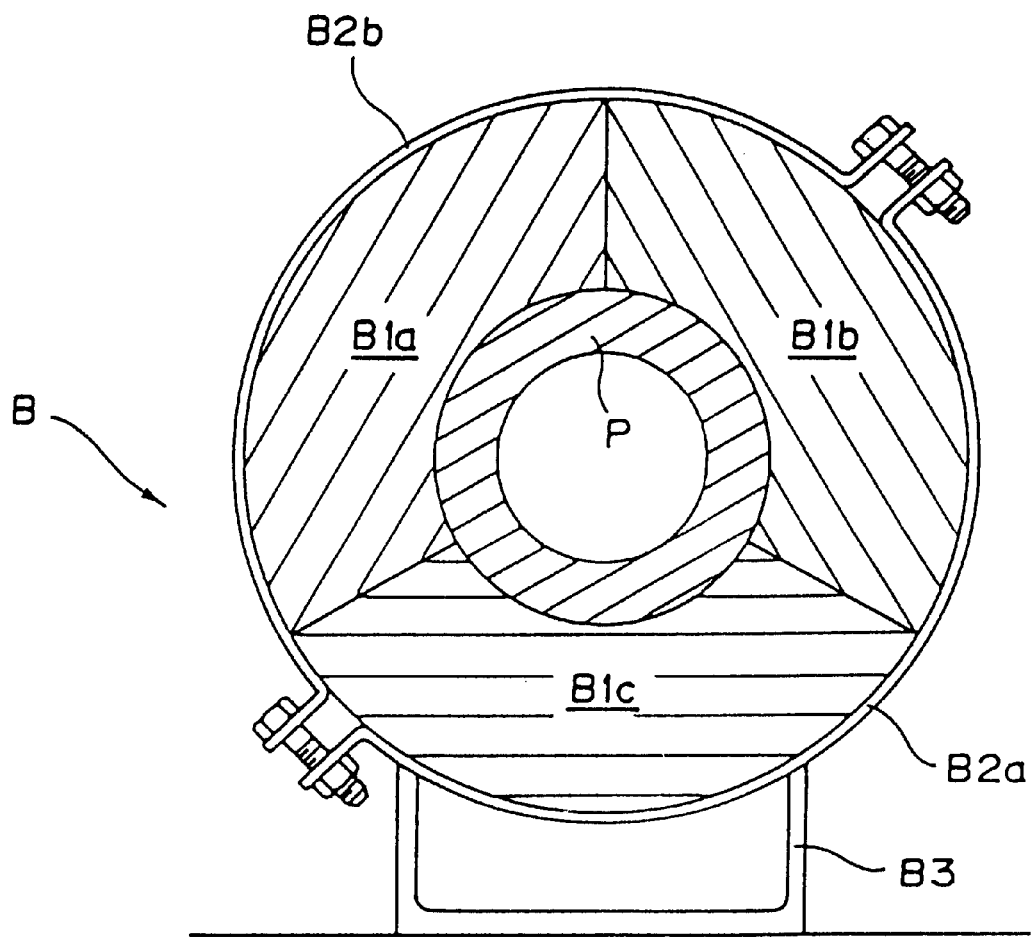
FIG. 8 is a sectional view illustrating another conventional prior art thermal insulating supporting device together with piping.

The piping support 30 used in the thermal insulating supporting device 1 has the shape of a square tube, and the piping supports 30' used in the thermal insulating device 1' has an L-shaped cross section. However, it goes without saying that the shape of the piping support(s) S can be appropriately designed in accordance with various conditions such as the shape (diameter) and weight of the piping P that is to be supported, and the characteristics of the material forming the piping support(s), as is shown by several examples in FIGS. 6(a) through (6)d.

In the thermal insulating supporting device 1 and heat-insulating supporting device 1' described above, the respective piping supports are made of an FRP (fiber-reinforced plastic). However, it would also of course be possible to form these piping supports from an appropriate plastic other than an FRP, as long as this resin material has thermal insulating properties and sufficient strength to support the piping.

Furthermore, it goes without saying that the heat-insulating supporting device of the present invention can be used very effectively not only in cases where various types of piping are laid in various types of plants other than chemical plants, but also in various other industrial fields where there is a need to support and heat-insulate various types of piping, e. g., piping in LPG (liquefied petroleum gas) manufacturing plants, LPG storage plants, ammonia manufacturing plants, ethylene manufacturing plants, frozen storage warehouses and refrigerated warehouses, etc.

While various embodiments of the present invention have been shown and described, it should be understood that other. modifications, substitutions and alternatives can be made without departing from the spirit and scope of the invention, which should be determined from the appended claims.

Various features of the invention are set forth in the appended claims.

What is claimed is:

1. A thermal insulating supporting device in combination with piping, said thermal insulating supporting device comprising:
    a supporting frame which is fastened directly to the piping, said supporting frame being in the form of at least one plate whose material is the same as that of the piping;
    a supporting member provided under the piping and directly fixed to said supporting frame, for supporting the piping, said supporting member having a side face and being formed by cutting to specified dimensions a long member having a specified cross-sectional shape and made of a resin material having thermal insulating properties and a strength sufficient to support the piping; and
    a base frame having a bottom plate that defines a horizontal plane and at least one vertical plate extending generally perpendicularly to said bottom plate, said at least one vertical plate having a lower end attached to said bottom plate and a side attached to said side face of the supporting member.

2. The thermal insulating supporting device as defined in claim 1, wherein said supporting member extends generally radially from the piping.

3. The thermal insulating supporting device as defined in claim 1, wherein said specified cross-sectional shape is a polygonal tube.

4. The thermal insulating supporting device as defined in claim 1, wherein said supporting frame is permanently affixed directly to said piping.

5. The thermal insulating supporting device as defined in claim 4, wherein said supporting frame is welded directly to said piping.

6. The thermal insulating supporting device as defined in claim 1, wherein said plate of said supporting frame is generally flat.

7. The thermal insulating supporting device as defined in claim 1, wherein said supporting frame only contacts said piping at a fraction of its cross-sectional circumference, such that said supporting frame does not fully enclose any portion of said cross-sectional circumference of said piping.

8. The thermal insulating supporting device as defined in claim 1, wherein said specified cross-sectional shape of said supporting member is generally uniform along the length thereof.

9. The thermal insulating supporting device as defined in claim 1 wherein said supporting frame includes two plates and said supporting member includes a second side face opposite said side face, and further wherein one of each of said plates is configured to be attached to each of said side face and said second side face.

10. A thermal insulating supporting device in combination with piping, said thermal insulating supporting device comprising:
    a supporting frame which is directly fastened to the piping, said supporting frame being in the form a plate whose material is the same as that of the piping; and
    a supporting member having a side plate connected to said supporting frame and a bottom plate for installation of the supporting device, said supporting member extending along an axial direction of the piping and being provided under the piping and directly fixed to said supporting frame, for supporting the piping, said supporting member being formed by cutting to specified dimensions a long member having an L-shaped cross-section and made of a resin material having thermal insulating properties and a strength sufficient to support the piping.

11. The thermal insulating supporting device as defined in claim 10 wherein said supporting frame is welded directly to said piping.

12. The thermal insulating supporting device as defined in claim 10 wherein said supporting member further comprises a second member having an L-shaped cross-section and made of a resin material having thermal insulating properties and a strength sufficient to support the piping.

13. The thermal insulating supporting device as defined in claim 12 further comprising a thermal insulating plate positioned between said member having an L-shaped cross-section and said second member having an L-shaped cross-section.

14. The thermal insulating supporting device as defined in claim 10, wherein said plate of said supporting frame is generally flat.

* * * * *